(12) United States Patent
Bazin et al.

(10) Patent No.: US 11,968,054 B2
(45) Date of Patent: Apr. 23, 2024

(54) METHOD AND SYSTEM FOR BROADCASTING A MESSAGE TO A WEARER OF A WATCH

(71) Applicant: The Swatch Group Research and Development Ltd, Marin (CH)

(72) Inventors: Jean-Luc Bazin, Tuscherz-Alfermee (CH); Paulo Bravo, Marin-Epagnier (CH)

(73) Assignee: The Swatch Group Research and Development Ltd, Marin (CH)

( * ) Notice: Subject to any disclaimer, the term of this patent is extended or adjusted under 35 U.S.C. 154(b) by 578 days.

(21) Appl. No.: 16/939,249

(22) Filed: Jul. 27, 2020

(65) Prior Publication Data
US 2021/0051032 A1 Feb. 18, 2021

(30) Foreign Application Priority Data
Aug. 16, 2019 (EP) .................................. 19192105

(51) Int. Cl.
*H04L 12/18* (2006.01)
*G04G 21/04* (2013.01)
*G06F 3/14* (2006.01)
*H04B 1/3827* (2015.01)
*H04L 67/53* (2022.01)

(52) U.S. Cl.
CPC .............. *H04L 12/18* (2013.01); *G04G 21/04* (2013.01); *G06F 3/14* (2013.01); *H04B 1/385* (2013.01); *H04L 67/53* (2022.05)

(58) Field of Classification Search
CPC ......... H04L 12/18; H04L 67/53; G04G 21/04; G04G 9/0064; G04G 5/027; G04G 1/1637; G04G 1/1698; G06F 3/14; G06F 1/1613; G06F 1/163; G06F 1/1637; G06F 1/1698;
(Continued)

(56) References Cited

U.S. PATENT DOCUMENTS 4,435,046 A * 3/1984 Nishimura ........... G04G 9/0082
368/242
4,644,352 A * 2/1987 Fujii ..................... G08B 5/228
455/100
(Continued)

FOREIGN PATENT DOCUMENTS

CN 103105771 A 5/2013
CN 105701673 A 6/2016
(Continued)

OTHER PUBLICATIONS

Russian Office Action dated Jan. 12, 2021 in Russian Patent Application No. 2020126780/07(047123) (with English language translation), 9 pages
(Continued)

*Primary Examiner* — Charles L Beard
(74) *Attorney, Agent, or Firm* — Oblon, McClelland, Maier & Neustadt, L.L.P.

(57) ABSTRACT

The invention relates to a method for broadcasting a message to a wearer of a watch comprising a step of digitising, by way of an electronic device, a graphical representation displayed in an aperture of a dial of said watch and a step of transmitting, by way of said electronic device, the message associated with said digitised graphical representation.

15 Claims, 1 Drawing Sheet

(58) Field of Classification Search
CPC ............ H04B 1/385; H04B 1/40; G04D 7/12; H04W 84/16
See application file for complete search history.

(56) References Cited

U.S. PATENT DOCUMENTS

| | | | |
|---|---|---|---|
| 5,329,501 A * | 7/1994 | Meister | G04R 60/06 340/7.53 |
| 5,475,653 A * | 12/1995 | Yamada | G04G 9/0064 368/80 |
| 5,537,407 A * | 7/1996 | Park | G08B 5/223 340/7.34 |
| 5,572,488 A | 11/1996 | Yamada et al. | |
| 5,691,962 A * | 11/1997 | Schwartz | G04B 19/30 368/88 |
| 6,084,828 A * | 7/2000 | Bland | G04G 9/0082 368/80 |
| 7,190,518 B1 * | 3/2007 | Kleinberger | G02B 30/25 348/57 |
| 8,823,494 B1 | 9/2014 | Kovitz et al. | |
| 8,922,545 B2 * | 12/2014 | Bennett | H04N 13/351 345/418 |
| 9,348,320 B1 * | 5/2016 | Defazio | G04G 9/0064 |
| 9,575,466 B1 * | 2/2017 | Thompson | G04B 47/06 |
| 10,083,018 B1 * | 9/2018 | Rizea | H04L 67/01 |
| 10,782,651 B2 * | 9/2020 | Olsen | G06T 7/70 |
| 10,866,566 B2 * | 12/2020 | Modaragamage | G04G 17/00 |
| 10,987,053 B2 * | 4/2021 | Garinaud | G01C 22/006 |
| 11,536,605 B2 * | 12/2022 | You | G01J 3/0208 |
| 2002/0085155 A1 * | 7/2002 | Arikawa | G02F 1/133509 349/129 |
| 2003/0006607 A1 * | 1/2003 | Kitagawa | G04B 19/22 283/81 |
| 2003/0123328 A1 * | 7/2003 | Guanter | G04G 11/00 368/82 |
| 2003/0165086 A1 * | 9/2003 | Brewer | G02F 1/133536 368/82 |
| 2003/0193842 A1 * | 10/2003 | Harrison | G04C 17/00 368/82 |
| 2004/0013042 A1 * | 1/2004 | Farine | G04G 17/005 368/10 |
| 2004/0047244 A1 * | 3/2004 | Lino | H04M 1/21 368/276 |
| 2005/0201210 A1 * | 9/2005 | Matthey | G04B 19/065 368/223 |
| 2006/0073851 A1 * | 4/2006 | Colando | G06F 1/1637 455/566 |
| 2006/0158966 A1 * | 7/2006 | Maire | G04B 37/0033 368/295 |
| 2013/0170327 A1 * | 7/2013 | Peters | G04G 21/04 368/62 |
| 2013/0173713 A1 * | 7/2013 | Anderson | H04L 67/10 709/205 |
| 2013/0234850 A1 * | 9/2013 | Lee | A61B 5/6898 340/539.12 |
| 2013/0250735 A1 * | 9/2013 | Takenawa | G04G 9/0064 368/243 |
| 2014/0036640 A1 * | 2/2014 | Takenawa | G04G 21/04 368/37 |
| 2014/0295918 A1 * | 10/2014 | Grifoni | G06F 1/163 455/566 |
| 2014/0334271 A1 * | 11/2014 | Park | G01B 21/16 368/10 |
| 2015/0029826 A1 * | 1/2015 | Antognini | G04G 9/0064 368/10 |
| 2015/0029829 A1 * | 1/2015 | Spadini | G04C 17/0091 368/228 |
| 2015/0073907 A1 * | 3/2015 | Purves | G06Q 20/384 705/14.58 |
| 2015/0177703 A1 * | 6/2015 | Klopfenstein | G04G 9/085 345/33 |
| 2015/0195277 A1 * | 7/2015 | Faaborg | H04M 19/04 726/9 |
| 2015/0301506 A1 * | 10/2015 | Koumaiha | G04G 21/08 345/174 |
| 2015/0346768 A1 * | 12/2015 | Popalis | G06F 1/163 361/679.03 |
| 2015/0371215 A1 * | 12/2015 | Zhou | G06F 3/041 705/64 |
| 2015/0378320 A1 * | 12/2015 | Knight | G04G 15/00 368/107 |
| 2016/0085366 A1 * | 3/2016 | Chi | G06F 1/163 345/173 |
| 2016/0103427 A1 * | 4/2016 | Westra | G04G 9/0076 368/22 |
| 2016/0117141 A1 * | 4/2016 | Ro | G06F 3/04883 715/748 |
| 2016/0154624 A1 * | 6/2016 | Son | G06F 3/0416 704/235 |
| 2016/0239091 A1 * | 8/2016 | Forutanpour | G06F 1/1641 |
| 2016/0239142 A1 * | 8/2016 | Kim | G04G 21/08 |
| 2016/0259488 A1 * | 9/2016 | Chan | G06F 3/0482 |
| 2016/0267310 A1 * | 9/2016 | AlNasser | G06F 1/1698 |
| 2016/0299679 A1 * | 10/2016 | Park | G04G 9/0064 |
| 2016/0341568 A1 | 11/2016 | Roush | |
| 2017/0038845 A1 * | 2/2017 | Chi | H04M 1/05 |
| 2017/0060094 A1 * | 3/2017 | Aihara | G04R 60/14 |
| 2017/0064065 A1 * | 3/2017 | Lee | H04M 1/72412 |
| 2017/0083045 A1 * | 3/2017 | Shim | G06F 1/163 |
| 2017/0115940 A1 * | 4/2017 | Byeon | G06F 3/0346 |
| 2017/0176951 A1 * | 6/2017 | Hsieh | G04G 17/045 |
| 2017/0185048 A1 * | 6/2017 | Yuen | G04G 21/04 |
| 2017/0199588 A1 * | 7/2017 | Ahn | G06F 3/038 |
| 2017/0237459 A1 * | 8/2017 | Kim | H04N 21/43615 455/575.6 |
| 2017/0262876 A1 * | 9/2017 | Shaffer | H04L 12/08 |
| 2017/0372328 A1 * | 12/2017 | Vaysman | G06K 7/10722 |
| 2018/0039232 A1 * | 2/2018 | Abramov | G04C 17/0091 |
| 2018/0059624 A1 * | 3/2018 | James | G04B 47/06 |
| 2018/0075156 A1 * | 3/2018 | Broselow | G06K 7/10861 |
| 2018/0164749 A1 * | 6/2018 | Yuen | G04G 17/045 |
| 2018/0225701 A1 * | 8/2018 | Han | G06Q 20/327 |
| 2018/0239527 A1 * | 8/2018 | Kwon | G06F 3/01 |
| 2018/0248991 A1 * | 8/2018 | Ryu | H04M 1/72469 |
| 2018/0293474 A1 * | 10/2018 | Almog | G09C 5/00 |
| 2018/0299292 A1 | 10/2018 | Roush | |
| 2018/0348815 A1 * | 12/2018 | Popalis | G03B 17/40 |
| 2019/0018372 A1 * | 1/2019 | Blanckaert | G04B 19/30 |
| 2019/0138145 A1 * | 5/2019 | Brisimitzakis | G04G 17/08 |
| 2019/0146413 A1 * | 5/2019 | Lagorgette | G04B 19/25333 368/37 |
| 2019/0227497 A1 * | 7/2019 | Matsuoh | G04C 10/02 |
| 2020/0001195 A1 * | 1/2020 | Mitchell | G06F 3/0236 |
| 2020/0015242 A1 * | 1/2020 | Hu | H04W 72/56 |
| 2020/0019127 A1 * | 1/2020 | Klopfenstein | G04G 5/027 |
| 2020/0073330 A1 * | 3/2020 | Tortora | G04B 31/08 |
| 2020/0133398 A1 * | 4/2020 | Williams | G06F 3/017 |
| 2020/0150594 A1 * | 5/2020 | Koller | G04B 19/247 |
| 2020/0153260 A1 * | 5/2020 | Yuen | G04G 21/04 |
| 2020/0285211 A1 * | 9/2020 | Matsuoh | H04B 1/385 |
| 2020/0348627 A1 * | 11/2020 | Connor | H04N 23/695 |
| 2020/0379411 A1 * | 12/2020 | Watanabe | H04M 1/72412 |
| 2021/0173222 A1 * | 6/2021 | Makinen | H04N 13/31 |
| 2021/0181571 A1 * | 6/2021 | Blanckaert | G04G 9/06 |
| 2021/0191340 A1 * | 6/2021 | Lagorgette | G04G 5/002 |
| 2021/0223743 A1 * | 7/2021 | Baba | G04B 19/247 |
| 2021/0233134 A1 * | 7/2021 | Marin | G06Q 20/346 |
| 2021/0239847 A1 * | 8/2021 | Sayem | H01Q 7/00 |
| 2021/0259049 A1 * | 8/2021 | Matsuoh | G06F 3/0482 |
| 2021/0349583 A1 * | 11/2021 | Guzman | G06F 3/04817 |
| 2021/0367006 A1 * | 11/2021 | Hunt | G06V 40/171 |
| 2021/0389795 A1 * | 12/2021 | Chang | G06F 1/1635 |
| 2021/0391930 A1 * | 12/2021 | Davis | H01L 27/14627 |
| 2021/0397139 A1 * | 12/2021 | D'Auria | G06F 1/1454 |
| 2022/0090964 A1 * | 3/2022 | You | G01J 3/0229 |
| 2022/0095024 A1 * | 3/2022 | Liang | H04R 1/44 |
| 2022/0155817 A1 * | 5/2022 | Woods, Jr. | G04R 60/10 |
| 2022/0171340 A1 * | 6/2022 | Rey-Mermet | G04B 19/268 |
| 2022/0214785 A1 * | 7/2022 | Giv | G06F 3/0484 |
| 2022/0283551 A1 * | 9/2022 | Atmatzakis | G01S 19/14 |
| 2022/0308356 A1 * | 9/2022 | Makinen | H04N 13/305 |

(56) References Cited

U.S. PATENT DOCUMENTS

| | | | |
|---|---|---|---|
| 2022/0376003 A1* | 11/2022 | Wang | H01L 27/3265 |
| 2022/0392982 A1* | 12/2022 | Yamazaki | G02B 27/0172 |
| 2022/0413163 A1* | 12/2022 | Sayem | H01Q 1/273 |
| 2023/0099404 A1* | 3/2023 | Karri | G06F 3/1423 |
| | | | 345/156 |

FOREIGN PATENT DOCUMENTS

| | | |
|---|---|---|
| EP | 2 527 930 A1 | 11/2012 |
| EP | 3 298 461 A4 | 12/2018 |
| JP | 2019-128351 A | 8/2019 |
| KR | 10-2016-0147340 A | 12/2016 |
| RU | 41 885 U1 | 11/2004 |
| WO | WO 95/16939 A1 | 6/1995 |

OTHER PUBLICATIONS

Office Action dated Nov. 16, 2021 in corresponding Indian Patent Application No. 202044034786 (with English Translation), 5 pages.
European Search Report issued Feb. 5, 2020 in European Application 19192105.5 filed Aug. 16, 2019 (with English Translation of Categories of Cited Documents), 3 pages.
Combined Chinese Office Action and Search Report issued Sep. 3, 2021 in Chinese Patent Application No. 202010822958.4 (with English translation), 21 pages.
Office Action issued Feb. 3, 2022 in corresponding Korean Patent Application No. 10-2020-0102043 (with English Translation), 8 pages.
Office Action issued Aug. 24, 2021 in corresponding Japanese Patent Application No. 2020-132158 (with English Translation), 7 pages.

* cited by examiner

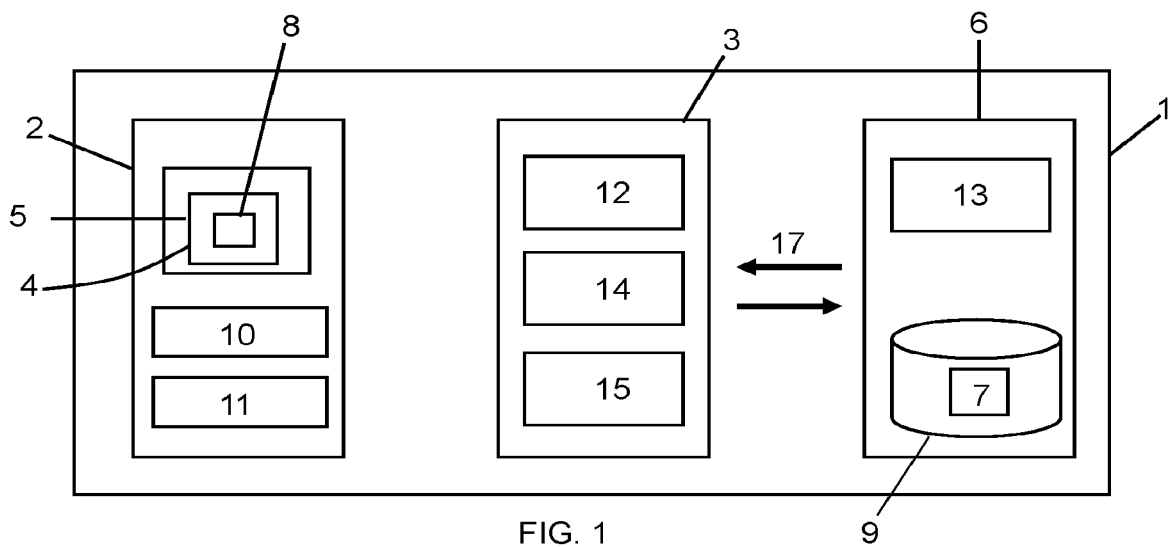
FIG. 1
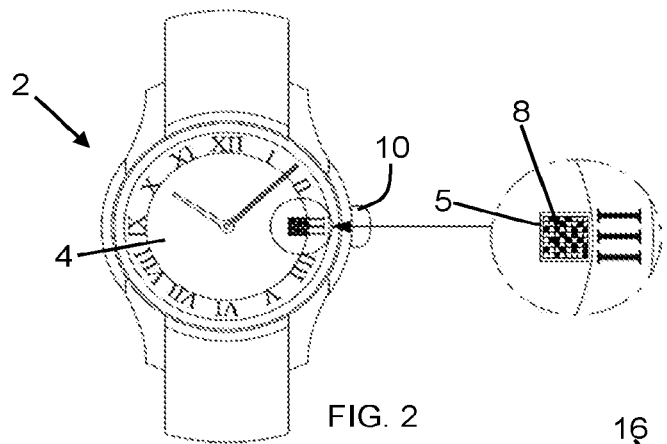
FIG. 2
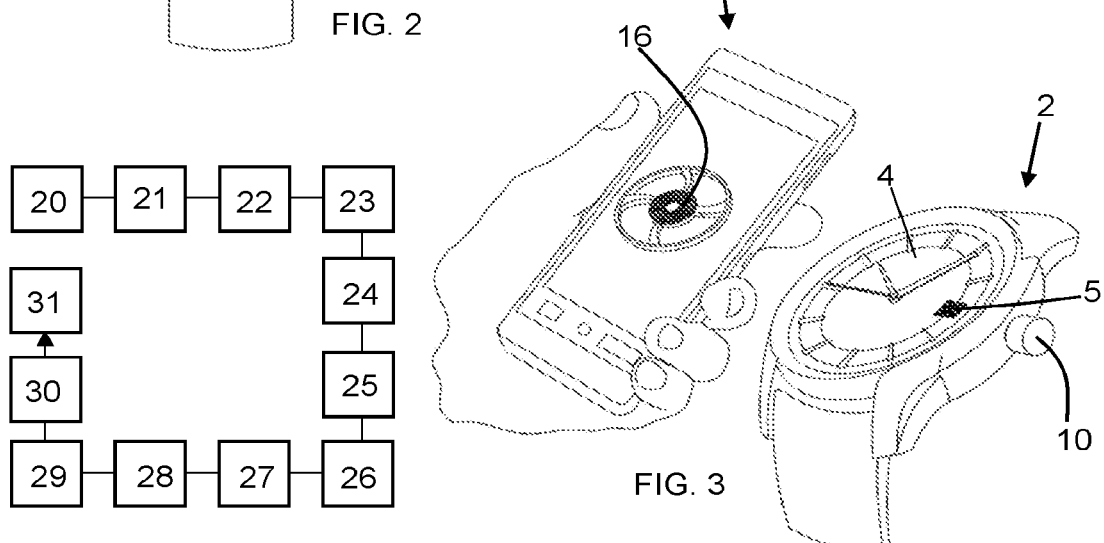
FIG. 3
FIG. 4

METHOD AND SYSTEM FOR BROADCASTING A MESSAGE TO A WEARER OF A WATCH

CROSS-REFERENCE TO RELATED APPLICATIONS

This application is based on and claims priority under 35 U.S.C. § 119 to European Application No. 19192105.5, filed on Aug. 16, 2019, the entire contents of which are incorporated herein by reference.

TECHNICAL FIELD

The invention relates to a method for broadcasting a message to a wearer of a watch and a system implementing such a method.

The invention further relates to a watch comprising a dial displaying a graphical representation relative to the message to be broadcast, in addition to a computer program.

TECHNOLOGICAL BACKGROUND

In the prior art, different methods are involved in transmitting a message by way of a timepiece. For example, methods are known to consist of printing such a message on a part of the timepiece such as the bracelet so that it is seen by the wearer and recipient of the message, provided that he/she is in possession of the timepiece. Other methods are also known, designed to transmit this message by way of a screen comprised in a component part of the timepiece, for example the dial, such methods implementing, in order to broadcast this message, technologies for telecommunication between a remote server and said timepiece provided with this screen.

However, such methods suffer from a major drawback connected to security and confidentiality when transmitting such a message. More specifically, individuals other than the wearer of the timepiece can also see this message if they are in possession of this timepiece.

It is understood that there is a need to find an alternative solution, in particular which overcomes the drawbacks of the prior art.

SUMMARY OF THE INVENTION

For this purpose, the invention relates to a method for broadcasting a message to a wearer of a watch comprising a step of digitising, by way of an electronic device, a graphical representation displayed in an aperture of a dial of said watch and a step of transmitting, by way of said electronic device, the message associated with said digitised graphical representation.

In other embodiments:
- the method comprises a step of displaying said graphical representation in the aperture of the dial;
- the display step comprises a sub-step of selecting the graphical representation to be displayed in said aperture involving the actuation of at least one control member of said watch;
- the digitisation step comprises a sub-step of acquiring the graphical representation involving the arrangement of the electronic device in the immediate vicinity of the watch such that an acquisition module of the electronic device is disposed facing this graphical representation situated in the aperture of the dial;
- the transmission step comprises a sub-step of decoding a matrix code comprised in the graphical representation in order to obtain binary information sequences including data regarding a location of a digital file comprising said message;
- the transmission step comprises a sub-step of generating, by way of the electronic device, a request to obtain a digital file comprising message data from binary information sequences comprising data regarding a location of said digital file;
- the transmission step comprises a sub-step of transmitting, by way of the server of the trusted third party, a digital file comprising message data to the electronic device;
- the transmission step comprises a sub-step of processing message data comprising a phase of generating a broadcast signal for the message;
- the processing sub-step comprises a phase of transmitting this broadcast signal to the broadcast interface of the electronic device.

The invention further relates to a system for broadcasting a message to a wearer of a watch comprising said watch and elements capable of communicating with one another such as an electronic device and a server of a trusted third-party message provider, said watch comprising a dial provided with an aperture in which is displayed a graphical representation relative to said message capable of being broadcast by the electronic device.

The invention further relates to a watch comprising a dial provided with an aperture in which is displayed a graphical representation relative to a message capable of being broadcast by an electronic device.

The invention further relates to a computer program comprising program code instructions for executing the steps of this method, when said computer program is executed by the processing units of the electronic device and of a server of a trusted third-party message provider.

BRIEF DESCRIPTION OF THE FIGURES

The invention will be described in more detail hereinafter using the accompanying drawings, given by way of examples that are in no way limiting, wherein:

FIG. 1 shows a system for broadcasting a message to a wearer of a watch, according to one embodiment of the invention;

FIG. 2 shows a watch of the system comprising a graphical representation comprised in an aperture of said watch according to the embodiment of the invention;

FIG. 3 shows an electronic device and the watch of the system cooperating with one another so as to broadcast a message to the wearer of the watch, and FIG. 4 shows a flow chart regarding a method for broadcasting a message to a wearer of the watch.

DETAILED DESCRIPTION OF THE INVENTION

FIG. 1 shows a system 1 for broadcasting a message to a wearer of a watch 2 by way of an electronic device 3 after the acquisition thereby of at least one graphical representation 8 relative to said message 16, comprised on/in a dial 4 of said watch 2 implemented in this system 1.

This system 1 comprises:
- the watch 2;
- the electronic device 3;

a server 6 of a trusted third-party provider of messages 16 including a database 9 provided with a plurality of electronic files 7 relative to messages 16 capable of being broadcast to the wearer of the watch 2; and a wired and/or wireless network architecture connecting the electronic device 3 and the server 6 to one another.

Such a system 1 thus allows the wearer of the watch 2 shown in FIGS. 2 and 3 to receive a visual and/or audible message 16 broadcast by the electronic device 3, said message 16 being associated with the graphical representation 8 present on/in the dial 4 of the watch 2. Such a watch 2 comprises a dial 4, for example a hybrid display dial 4 thus capable of being provided with a first analogue display component and with a second digital and/or alphanumerical display component. This watch 2 can further comprise a tactile crystal, a crown and push-buttons each of which act as a control member 10 for this watch 2 for implementing various functions of this watch 2. In this watch 2, the graphical representation 8 is preferably intended to be displayed in an opening 5 defined in the dial 4 of the watch 2 forming the aperture 5. More specifically, this graphical representation 8 is included on a disc 11 of this watch 2 disposed relatively to the dial 4 so as to position, in particular on command, the graphical representation 8 comprised on the surface thereof in the aperture 5 of this dial 4. This disc 11 is preferably a rotating/moving disc 11 such as a date-disc 11 comprising, on the surface thereof, in addition to the graphical representation 8, symbols relative to different or similar horometrical information. This horometrical information can comprise, for example, a date, the annual cycle number or even the name of the current month. It should be noted that this surface of the disc 11 on which the graphical representation 8 and these symbols are defined, is situated facing a rear face or a non-visible face of the dial 4. Moreover, the control members 10 of this watch 2 are preferably kinematically linked to the rotating disc 11 when the watch 2 comprises a mechanical movement or even electronically linked to this disc 11 when it is provided with an electronic movement.

In the present embodiment, this rotating disc 11 can be divided into thirty-two consecutive positions including thirty-one positions representative of the dates of the current month and a thirty-second position situated between the first and the thirty-first position, comprising the graphical representation 8.

This graphical representation 8 visible in FIG. 2, comprises a matrix code. This matrix code can be a two- or three-dimensional bar code. This matrix code can, for example, comprise a QR code or even a data matrix code. This matrix code comprises binary information sequences which are encoded/encrypted. In the graphical representation 8, the matrix code comprises binary information sequences including data regarding a location of a digital file 7 comprising message 16 data. In other words, this data of the binary information sequences, in this embodiment, regards a hyperlink allowing the digital file 7 to be recovered from the server 6. It is understood that such data can, in another embodiment, be an element for identifying this digital file 7, allowing the server 6, after receiving a request comprising this identifying element, to transmit this file 7 to the electronic device 3. It goes without saying that this request is initially generated and transmitted to the server 6 by the electronic device 3.

Such a message 16 comprised in the digital file 7 is thus transmitted to this electronic device 3 by the server 6. Such a server 6 thus comprises the database 9 including digital files 7 regarding the messages 16 capable of being broadcast by the electronic device 3, and optionally for each of these digital files 7, an identifying element. This server 6 further comprises a processing unit 12 provided with hardware and software resources, in particular at least one processor cooperating with memory elements. The server 6 further comprises a communications unit for receiving and transmitting data remotely via the cellular telephone network, a data network of the IP type via the telephone network or a data network of the IP type via a wired Ethernet-type network.

In this system 1, it is understood that the broadcasting of messages 16 by way of the electronic device 3 can in particular result in a data stream of Web application data and content originating from this server 6.

Furthermore, the electronic device 3 in this system 1 can comprise, for example: a computer, a smartphone, a terminal or even a tablet. Such an electronic device 3 can be mobile and/or portable and/or compact. This electronic device 3 includes, in a non-limiting and/or non-exhaustive manner:

a processing unit 13 including hardware and software resources, in particular at least one processor cooperating with memory elements;

an interface 14 for broadcasting messages 16 such as a screen or a loudspeaker-type audio module;

a communication interface allowing the electronic device 3 to establish a communication connection with the server 6 of the trusted third party in order to carry out a data exchange 17;

a selection interface such as a keyboard or even a touch-sensitive interface; and a module 15 for acquiring at least one image in particular comprising at least one image sensor, otherwise referred to as a matrix image sensor which can, for example, comprise CCD sensors (charge-coupled technology) or even so-called CMOS sensors.

In this electronic device 3, the processing unit 13 is connected, inter alia, to the broadcast interface 14, to the communication interface, to the acquisition module 15 and to the selection interface. The communication interface of this electronic device 3 comprises communication elements for receiving and transmitting data remotely via the cellular telephone network, a data network of the IP type via the telephone network or a data network of the IP type via a medium-range network, for example WI-FI or a short-range network implementing Bluetooth technology.

In the acquisition module 15, each image sensor comprises a matrix of photosensitive image dots (or pixels). This dot matrix is also referred to herein as a "pixel array" and comprises N×M unit pixels with excellent sensitivity to light. The acquisition module 15 further comprises an analogue-to-digital AD converter connected to the processing unit 13 of the electronic device 3.

With reference to FIG. 3, such a system 1 is capable of implementing a method for broadcasting this message 16 to the wearer of the watch 2. This method comprises a step 20 of displaying said graphical representation 8 in the aperture 5 of the dial 4. Such a step 20 comprises a sub-step 21 of selecting the graphical representation 8 to be displayed in said aperture 5 involving the actuation of at least one control member 10 of said watch 2. During this sub-step 21, the actuation of said at least one member 10 causes/generates the displacement of the rotating disc 11 relative to the dial 4 and in particular relative to the aperture 5 defined in this dial 4. This displacement of the rotating disc 11 is carried out until reaching a position allowing said at least one graphical representation 8 to be arranged in or facing this aperture 5. In other words, when the rotating disc 11 is divided into thirty-two consecutive positions with thirty-one positions representative of dates of the current month and a thirty-second position, comprising the graphical representation 8, situated between the first and the thirty-first position, then the displacement of the rotating disc 11 is carried out until this thirty-second position is situated facing the aperture 5. When this thirty-second position is located facing the aperture 5, then the graphical representation 8 comprised on the disc 11 is visible on the dial through this aperture 5.

The method then comprises a step 22 of digitising, by way of the electronic device 3, the graphical representation 8 displayed in the aperture 5. This step 22 comprises a sub-step 23 of acquiring this graphical representation 8 involving the arrangement of the electronic device 3 in the immediate vicinity of the watch 2 such that the acquisition module 15 is disposed facing this graphical representation 8 situated in the aperture 5 of the dial 4. During this sub-step 23, the pixel array detects at least one image originating from the graphical representation 8 and thus generates analogue signals regarding this representation 8. The analogue-to-digital converter of the acquisition module 15 then converts these analogue signals originating from this pixel array into digital signals which are transmitted to the processing unit 13 of the electronic device 3.

Thereafter, this method comprises a step 24 of transmitting, via said electronic device 3, the message 16 associated with said graphical representation 8. For this purpose, this step 24 comprises a sub-step 25 of decoding the matrix code comprised in the graphical representation 8 in order to obtain binary information sequences including data regarding a remote location of the digital file 7 comprising message data. During this sub-step 25, the processing unit 13 applies a decoding algorithm to said digital signals so as to obtain the binary information sequences including data regarding a location of this digital file 7. These binary information sequences preferably comprise, in this embodiment, a hyperlink.

This transmission step 24 then comprises a sub-step 26 of generating, by way of the electronic device 3, a request to obtain the digital file 7 comprising said message data from the binary information sequences including the data regarding the location of said digital file 7. During this sub-step 26, this request is generated, in this embodiment, in particular from the hyperlink.

This transmission step 24 further comprises a sub-step 27 of transmitting, by way of the server 6 of the trusted third party, the digital file 7 to the electronic device 3. After this sub-step 27, the processing unit 13 of the electronic device 3 implements, during this transmission step 24, a sub-step 28 of processing the message data comprised in said digital file 7 including a phase 29 of generating a broadcast signal for the message 16 and a phase 30 of transmitting this broadcast signal to the broadcast interface 14 of the electronic device 3. This transmission step 24 then comprises a sub-step 31 of generating the message 16 from the broadcast signal received. This message 16 thus generated therefore comprises:

an audio stream corresponding to an audio message 16;
a light stream corresponding to a message 16 of the two-dimensional or three-dimensional photographic type, or of the two-dimensional or three-dimensional graphic type;
a light stream corresponding to a message 16 of the two-dimensional or three-dimensional video type; or
simultaneous audio and light streams corresponding to an audio-video message 16.

Additionally, it should be noted that the message 16 can also correspond to confidential or private data specific to the wearer and used to access customised services. This data is, for example, keys, certificates, authentication codes, passwords and personal codes used to create a secure connection between the watch and a private network of a company, for authentication with secure servers such as a bank server, or a secure messaging service for sending and receiving signed and/or encrypted emails.

It can be seen that the method can provide for establishing a secure connection between the electronic device 3 and the server 6 during data exchanges 17 carried out therebetween.

The invention further relates to a computer program comprising program code instructions for executing steps of the method described hereinabove when said computer program is executed by the processing units 12, 13 of the server 6 and of the electronic device 3.

It goes without saying that the present invention is not limited to the example shown but that various alternatives and modifications that may be apparent to a person skilled in the art can be made thereto.

The invention claimed is:

1. A method for broadcasting a message to a wearer of a watch, the method comprising:
   displaying horometrical information via an aperture of a dial of the watch, the horometrical information being arranged on a surface of a rotatable disc;
   in response to actuation of a control member arranged on an external surface of the watch, rotating the disc so that the horometrical information is no longer displayed via the aperture, but a graphical representation that was not displayed before the rotating is displayed via the aperture,
   decoding, by an electronic device, a matrix code included in the graphical representation displayed via the aperture;
   generating, by the electronic device in response to decoding the matrix code, a request to obtain a digital file comprising message data, the request including address data of the digital file, the address data being obtained from the matrix code;
   transmitting, to a server by the electronic device, the generated request;
   receiving, by the electronic device from the server in response to transmitting the request, the digital file comprising the message data; and
   outputting, by the electronic device, the received message data.

2. The method according to claim 1, wherein the decoding step further comprises acquiring the graphical representation by arranging the electronic device in an immediate vicinity of the watch such that an acquisition module of the electronic device is disposed facing the graphical representation displayed in the aperture of the dial.

3. The method according to claim 1, further comprising generating a broadcast signal for the message.

4. The method according to claim 3, further comprising transmitting the broadcast signal to the broadcast interface of the electronic device.

5. A computer program product comprising a non-transitory computer-readable medium storing program code instructions for executing the steps of the method according to claim 1, when said computer program is executed by processing circuitry of the electronic device.

6. The method of claim 1, wherein the matrix code is arranged on the surface of the disc, which faces a non-visible face of the dial.

7. The method of claim 1, wherein the watch is not configured to communicate with the electronic device or the server.

8. The method of claim 1, wherein the horometrical information includes date information arranged in a circle, the graphical representation being also arranged in the circle.

9. The method of claim 1, wherein the disc includes thirty-two positions arranged in the circle,
the horometrical information includes thirty-one dates arranged in thirty-one corresponding positions around the circle, and
the graphical representation is arranged in a thirty-second position of the thirty-two positions.

10. The method of claim 1, wherein the graphical representation is hidden when the horometrical information is displayed, and the graphical representation is displayed only in response to the actuation of the control member.

11. A system for broadcasting a message to a wearer of a watch, the system comprising said watch and elements configured to communicate with one another including an electronic device and a server of a trusted third-party provider of messages, said watch comprising a dial, wherein the electronic device includes processing circuitry configured to:
display horometrical information via an aperture of a dial of the watch, the horometrical information being arranged on a surface of a rotatable disc;
in response to actuation of a control member arranged on an external surface of the watch, rotate the disc so that the horometrical information is no longer displayed via the aperture, but a graphical representation that was not displayed before the rotating is displayed via the aperture,
decode, by the electronic device, a matrix code included in the graphical representation;
generate, by the electronic device in response to decoding the matrix code, a request to obtain a digital file comprising message data, the request including address data of the digital file, the address data being obtained from the matrix code,
transmit, to the server by the electronic device, the generated request;
receive, by the electronic device from the server in response to transmitting the request, the digital file comprising the message data; and
output, by the electronic device, the received message data.

12. A watch, comprising:
a control member arranged on an external surface of the watch;
a dial provided with an aperture in which is displayed, at any given time, only one of horometrical information and a graphical representation encoding an address of a digital file stored on a server, the digital file including a message configured to be broadcast by an electronic device; and
a rotatable disc on which is included the graphical representation and the horometrical information, both being arranged on a surface of the rotatable disc facing a non-visible face of the dial, the rotatable disc, including both the horometrical information and the graphical representation, being rotated in response to actuation of the control member on the external surface of the watch at a time when the horometrical information is displayed so that the horometrical information is no longer displayed, but the graphical representation, which was previously hidden, is displayed via the aperture in response to the actuation of the control member on the external surface of the watch.

13. The watch of claim 12, wherein the rotatable disc includes thirty-two positions arranged in the circle,
the horometrical information includes thirty-one dates arranged in thirty-one corresponding positions around the circle, and
the graphical representation is arranged in a thirty-second position of the thirty-two positions.

14. The watch of claim 12, wherein the horometrical information includes date information arranged in a circle, the graphical representation being also arranged in the circle.

15. The watch of claim 12, wherein the graphical representation is hidden when the horometrical information is displayed, and the graphical representation is displayed only in response to the actuation of the control member.

* * * * *